United States Patent [19]

Malavenda

[11] 4,227,607
[45] Oct. 14, 1980

[54] HIGH VOLUME METHOD AND SYSTEM FOR DYNAMICALLY STORING ARTICLES FOR SORTING AND ROUTING

[76] Inventor: Peter P. Malavenda, 5 Colonial Ct., Armonk, N.Y. 10504

[21] Appl. No.: 30,081

[22] Filed: Apr. 16, 1979

[51] Int. Cl.³ .............................................. B65G 43/10
[52] U.S. Cl. .................................. 198/460; 198/469; 198/572; 198/575; 198/577; 198/857
[58] Field of Search ............... 198/356, 460, 462, 469, 198/572, 575, 577, 857

[56] References Cited

U.S. PATENT DOCUMENTS

| | | | |
|---|---|---|---|
| 3,187,878 | 6/1965 | Harrison et al. | 198/469 X |
| 3,731,787 | 5/1973 | Gregor | 198/356 |

Primary Examiner—Jeffrey V. Nase
Attorney, Agent, or Firm—Parmelee, Johnson, Bollinger & Bramblett

[57] ABSTRACT

An integrated high volume method and system for transporting and dynamically storing articles, such as luggage, baggage, identified items of cargo, parcels, and the like, for sorting and routing them is provided. The method and system are completely integrated, synchronized, and controlled to facilitate sorting and routing and to permit stopping of the entire system without loss of position or timing of any of the designated articles in the system. The article handling system includes a series of individually operable intermediate conveyors arranged in a continuous path between an input station and a coding or routing station. These intermediate conveyors are individually operable and have article-sensing means and control means which activate and deactivate the individual conveyors. When the system is operating in the conventional operating mode, all the conveyors are activated to transport articles. The buffer conveyors near the coding station are selectively stopped as articles become stored thereon. When all of the buffer conveyors become full, the intermediate conveyors are all simultaneously stopped. At this time, the system goes into the dynamic storage mode of operation, which involves selectively operating upstream intermediate conveyors when an article is sensed on an input conveyor, until the article on the input conveyor is removed and deposited on the first intermediate conveyor. The next successive intermediate conveyors are selectively operated when the preceding intermediate conveyor is filled with stored articles thereby advantageously, cumulatively utilizing the entire length of all intermediate conveyors for dynamically storing articles throughout the system.

22 Claims, 7 Drawing Figures

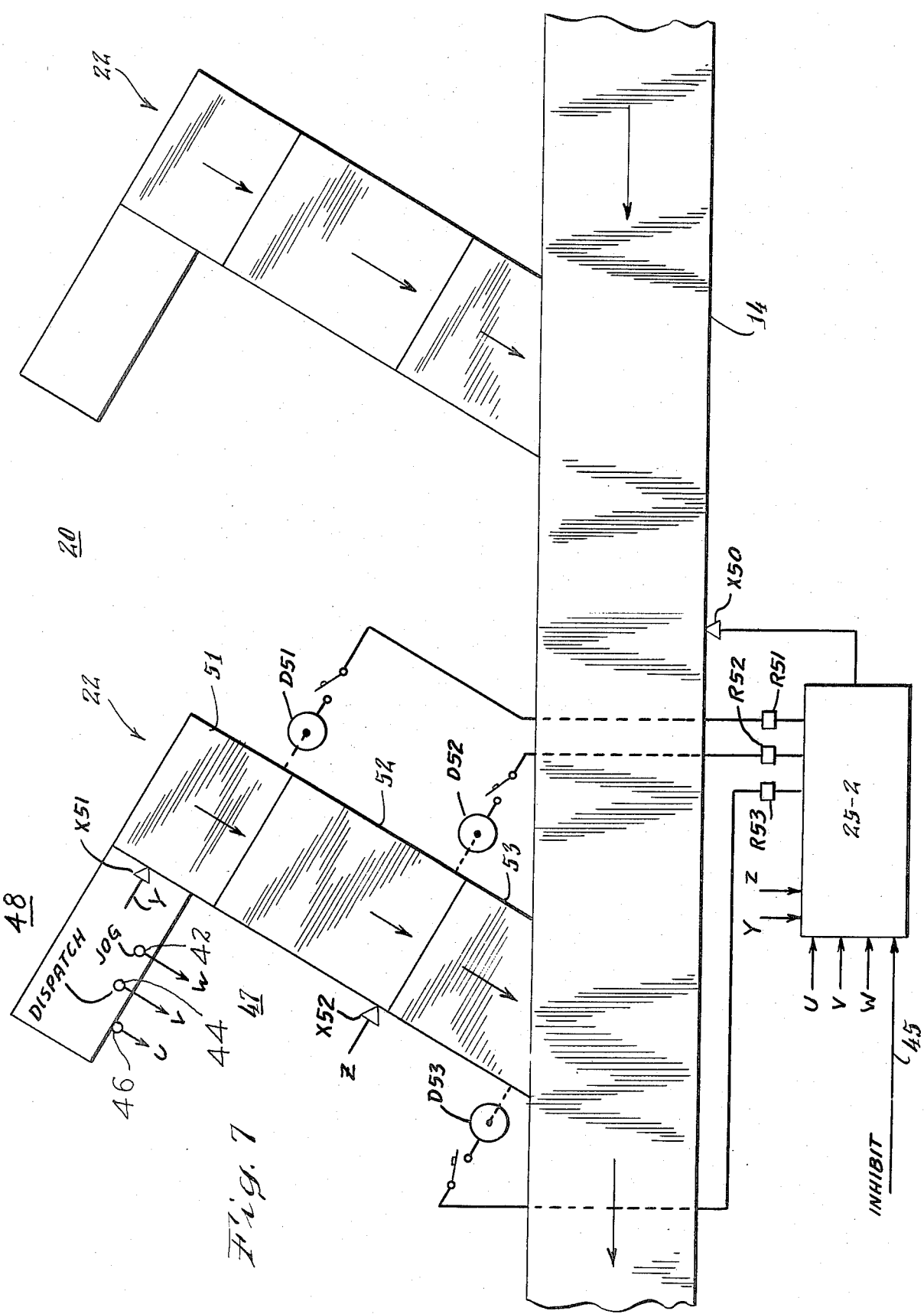

HIGH VOLUME METHOD AND SYSTEM FOR DYNAMICALLY STORING ARTICLES FOR SORTING AND ROUTING

BACKGROUND OF THE INVENTION

This invention relates to article handling systems, and more particularly to such systems using conveyors to convey and sort articles automatically with the minimum amount of manual handling. The present invention is directed particularly to that portion of the system which conveys articles from the passenger check-in areas to the baggage coding area where the operator directs tagged luggage to its proper destination.

A variety of prior art airline baggage sorting systems have been in use for some time. Such systems generally attempt to keep track of bag locations and of their intended designations. However, experience shows that such systems are unreliable, cannot be activated or stopped without the loss of data and loss of timing relationships, and some prior art baggage handling systems are so sophisticated and expensive and they require such a team of highly-trained technical personnel to operate and maintain them that they are not cost effective and become unreliable in practice. Such sophisticated prior art systems utilize complex computer control and have proven faulty due to down time during maintenance and complexity of repairs or by the elaborate changes required to make minor adjustments or minor changes in the baggage handling procedures. Moreover, many prior art baggage handling systems during "rush hour" periods directly overload the coding operator. The conveyor leading to the coding operator's station floods up with baggage; the coding operator in desperation is forced to remove the excess baggage by hand, such that the floor space around the operator becomes awkwardly piled up with baggage, thereby causing numerous individual items to become overlooked and unpredictably delayed.

SUMMARY OF THE INVENTION

It is an object of the present invention to provide a new and novel article handling method and system which are advantageous in operation and are reliable in actual practice and which avoid the sophistication of many prior art installations.

A further object of this invention is to provide a new and improved airline baggage handling method and system which fully utilize the length of all intermediate conveyors between a check-in station and a coding station for the dynamic storage of baggage to prevent any pile up or bottleneck in the coding function.

Still another object of this invention is to provide a new and novel airline baggage handling method and system which permit the operator at a coding station to continue directing the baggage to the proper destinations without having to shut the system down or manually remove excess articles because of being deluged with a continuous flow of articles into the coding station.

In carrying out this invention in one illustrative embodiment thereof, an airline baggage handling method and system are provided for transporting articles from a check-in station to a coding station where the articles are directed to specific designations. The system includes a series of individually operable intermediate conveyors arranged in a continuous path between the check-in station, which includes an input conveyor line, and a coding station having a plurality of short end-to-end buffer conveyors. A plurality of intermediate conveyors are coupled between the input conveyor line and these buffer conveyors. Sensors are provided for detecting the presence of articles on each of the conveyors. In the conventional operating mode, all of the intermediate conveyors and the buffer conveyors are simultaneously activated, thereby transporting articles from the check-in station to the coding station, where they are directed to the proper sorting spurs for loading onto respective airplane flights going to the various intended destinations. The buffer conveyors are selectively stopped as articles become temporarily stored thereon near the coding station. When all of the buffer conveyors have articles stored thereon, the system is then operated in the dynamic storage mode in which all the intermediate conveyors are all simultaneously stopped. In the dynamic storage mode, the upstream intermediate conveyor is selectively operated when an article is sensed on the downstream end of the input conveyor. The upstream intermediate conveyor is selectively operated until full and then the next successive intermediate conveyors are operated in sequence when the preceeding intermediate conveyor is filled with stored articles, thereby utilizing the entire length of all intermediate conveyors for dynamically storing articles thereon throughout the system. Thereafter, advancing one article at a time. When the system is unloaded and an article is removed from the downstream buffer conveyor, the system reverts to the conventional operating mode, until all buffer conveyors have items stored thereon and then the system returns to the dynamic storage mode, in which the intermediate conveyors again become selectively operable, and so forth.

The system also includes a plurality of sub-stations at the check-in station and means for moving in a shared manner articles from the various sub-stations onto the input conveyor line in an orderly manner which prevents any one of the upstream sub-stations from hogging the input conveyor line at the expense of the passenger receiving agents at downstream sub-stations arranged along the input conveyor line.

The airline baggage handling system allows bags to be stored along the entire length of the intermediate conveyors taking pressure off of the coding operator and allowing the coding operator to handle his routing function in an even orderly manner, without having to shut down the whole conveyor system or without requiring manual intervention to remove excess baggage and pile them helter skelter around the coding operator. This advantageous method and system enable the bags to be handled in a more orderly and expeditious fashion causing fewer errors in the coding operation, thereby providing reliability in assuring that the various transported articles reach their proper destinations.

BRIEF DESCRIPTION OF THE DRAWINGS

The invention, together with further objects, aspects and advantages thereof, will become better understood from a consideration of the following description taken in conjunction with the accompanying drawings, in which:

FIG. 7 is a block diagram of one form of control system which may be utilized for a plurality of sub-stations at the check-in station in order to provide a systematic feed-in of articles from the various sub-stations to the input conveyor line at the check-in station.

DESCRIPTION OF THE PREFERRED EMBODIMENTS

Figure 1:
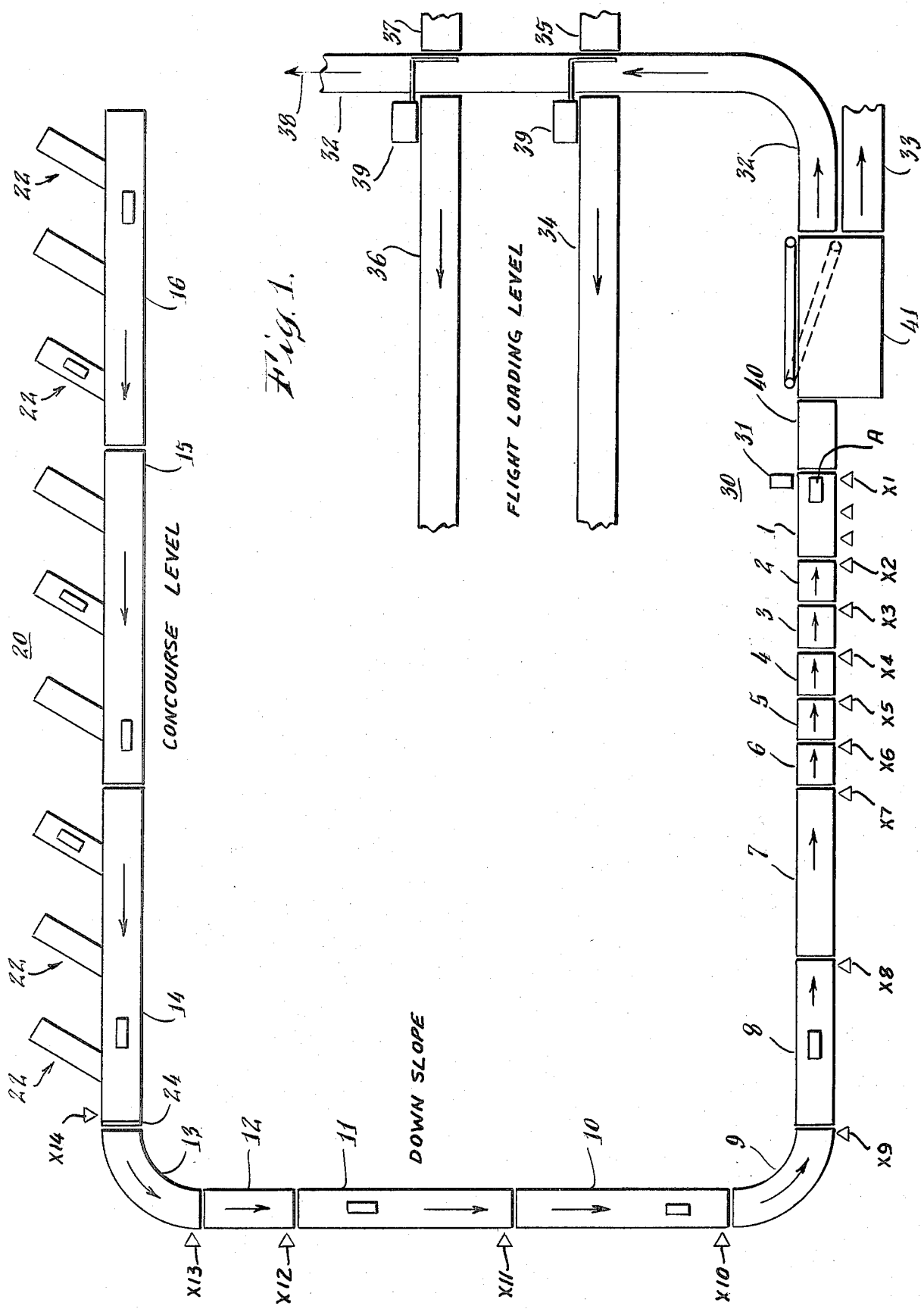
FIG. 1 is a top plan view of an illustrative embodiment of the airline baggage handling method and system embodying the present invention, illustrating operation in the conventional mode for continuously transporting articles from a passenger concourse check-in station to a coding station.

Referring now to FIG. 1, the airline baggage handling method and system in accordance with the present invention includes a series of individually operable conveyors 1 through 16 arranged in a continuous path between a concourse check-in station, generally indicated at 20, and a coding station 30 located elsewhere in the airline terminal. The present system is directed to the transportation of baggage, parcels, luggage, packages, identified items of cargo, or other items, which are checked in and are to be transported by the airline, all of which items are generally referred to as articles. Articles are checked in at the check-in station 20 at a plurality of sub-stations 22 where the respective agents tag the articles, each tag being indicative of the intended destination for the article. The tagged articles are transported to the input conveyor line, including conveyors 14 through 16 and then to a plurality of intermediate conveyors 13 through 7 leading to the coding station 30.

Near the coding station 30 are a plurality of buffer conveyors 1 through 6, with conveyor 1 constituting the downstream or forwardmost of these buffer conveyors. The coding station operator is provided with a dispatch coding panel 31. The coding operator determines the destination to which the article is to be sent by looking at the tag and checking the coding panel which identifies the airplane flight for that particular destination.

The operator then presses the appropriate button on the coding panel to direct the article onto one of several distribution conveyors 32, 33, the latter of which may lead to other tribulary distribution conveyors. The articles are pulled from distribution conveyor 32 onto respective sorting spurs 34, 35, 36, 37 destined for the various loading docks for the various flights. It is to be understood that the distribution conveyor 33 may lead to a series of sorting spurs similar to the sorting spurs 34, 35, 36 and 37 which are associated with the distribution conveyor 32. Additional sorting spurs (not shown) may be associated with the distribution conveyor 32, with the arrow 38 indicating the direction to such additional sorting spurs. Automatic baggage pullers 39 as known in the art serve to pull the articles from the distribution conveyor 32 onto the respective sorting spur.

There is a take-away conveyor 40, continuously running, which takes away the articles from the buffer conveyor 1 at the coding station 30 and leads directly to a switching conveyor 41. The coding panel 31 may be conventional and all of the conveyors downstream from the coding station 30 may be conventionally arranged as known in the art. They all are continuously running at a predetermined speed. Thus, the pressing of one of the buttons on the coding panel 31 causes a conventional control system to operate the switching conveyor 41 in an appropriate manner and actuates the respective baggage puller 39 at the appropriate moment to cause the article to reach the appropriate sorting spur 34, 35, 36 or 37, etc.

These sorting spurs and the coding station 30 are located at the flight loading level; whereas, the check-in station 20 and input conveyor line 16 through 14 are shown as being located on a concourse level where the passengers can conveniently check in at the various sub-stations 22. Thus, intermediate conveyors 13 through 7 slope down gradually for conveying the articles down to the flight loading level. If desired, the check-in station 20 and the input conveyor line 16 through 14 can be located on the same level as the flight loading level, in which case the intermediate conveyors 13 through 7 are all on the same level.

Each of the conveyors 1 through 14 has associated therewith sensors X1 through X14, respectively, positioned near the downstream end of the respective conveyor. These sensors may be in the form of photocells, light-emitting diodes, arm-activated switches, or any suitable article detector. A convenient arrangement is to place a light beam source and a photocell close together on the same side of the conveyor. The light beam is aimed at a retro-reflector on the opposite sie of the conveyor. Thus, the light beam normally is reflected directly back to the photocell. When an article blocks the light beam, the photocell functions to sense the presence of the article on the conveyor and to provide an output signal when an article is present.

When operating in the conventional baggage-handling mode, the flow of articles begins at the check-in station 20 as the tagged articles are applied to the intermediate conveyors 13 through 7 from the input conveyor 14. In leaving the input conveyor line 16-15-14 the articles pass through a conventional smoke door 24. In this mode of operation, all of the conveyors are being operated for running simultaneously and continuously, thereby transporting checked-in articles directly to the downstream short buffer conveyor 1 at the coding station 30. The buffer conveyors 2 through 6 are approximately 3 feet long, and the downstream buffer conveyor 1 is somewhat longer. The present embodiment illustrates the use of six buffer conveyors, but it will be appreciated that more or less may be employed for any particular installation.

The first article A fed from the input conveyor 14 travels along each conveyor in turn until it reaches buffer conveyor 1 as illustrated in FIG. 1. Article A is detected by sensor X1 which stops the buffer conveyor 1. If the article is not coded by the operator and directed onto one of the distribution conveyors 32, 33 it must remain temporarily stored on the buffer conveyor 1. The presence of article A temporarily retained at the coding position shown in FIG. 1 allows the check-in operations to continue uninterrupted.

Accordingly, the next article B continues along through the conveyor system, until it reaches the second buffer conveyor 2, where it is detected by sensor X2 which stops the conveyor 2, since conveyor 1 already as article A temporarily stored on it, being sensed by the sensor X1. As will be explained in connection with FIG. 5, the sensor signals are applied to a control which indicates that conveyor 1 has been stopped by the presence of an article on it, thereby stopping conveyor 2 when article B is sensed thereon.

Figure 2:
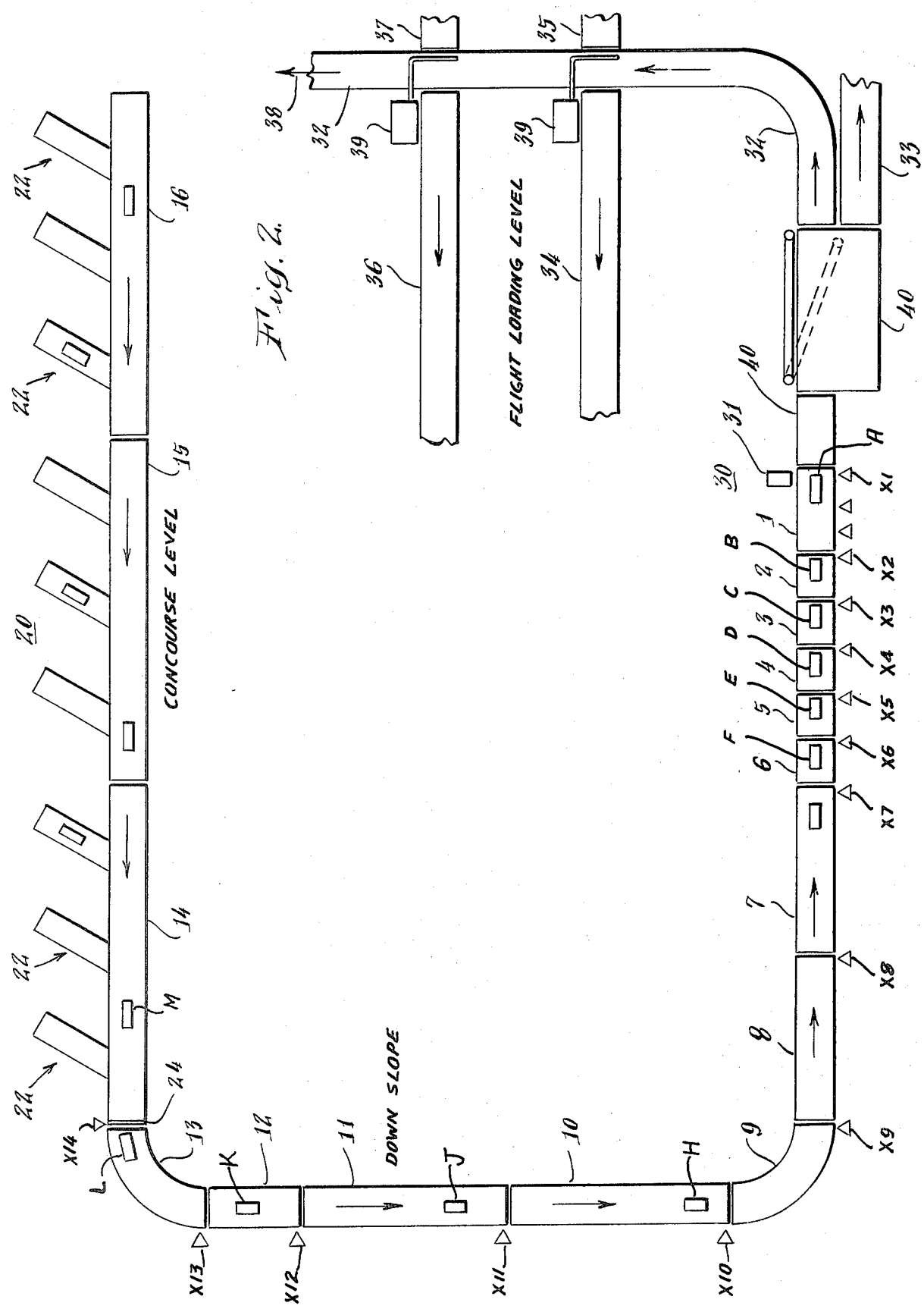
FIG. 2 is similar to FIG. 1, but illustrating the change-over in operation from the conventional mode to the dynamic storage mode, when the plurality of short end-to-end buffer conveyors located near the coding station are all occupied with articles.

This process of successively stopping each buffer conveyor continues until articles A through F are stored on the buffer conveyors 1 through 6 respectively, as shown in FIG. 2, at which time the conventional mode of operation of the system is converted to the dynamic storage mode of operation, as will be explained.

In the dynamic storage mode of operation, intermediate conveyors 7 through 13 are stopped immediately, even if articles such as G, H, J, K happen to be in transit on any or all of these intermediate conveyors. These articles remain in place on the now stationary intermediate conveyors 7 through 13, until the buffer conveyor 6 has been cleared, at which time the system returns to the conventional mode with all conveyors running continuously. The system will remain in the conventional mode of operation until the buffer conveyor 6 together with all of buffer conveyors 1 through 5 are again full.

If the system does not return to the conventional mode due to the fact that conveyors 6 through 1 still have articles F through A stored thereon, then the system remains in the dynamic storage mode of operation, which means that all of the intermediate conveyors 13 through 7 are stopped. Thus, the next occurring article L on the downstream end of the input conveyor 14 activates sensor X14, causing the first intermediate conveyor 13 to run until the sensor X14 becomes cleared, at which time intermediate conveyor 13 is stopped, leaving the article L at the leading or upstream end of the conveyor 13, as illustrated in FIG. 2.

The next article M occurring on the downstream end of the input conveyor 14 activates the sensor X14 and repeats the sequence of turning on conveyor 13 for advancing the individual article M only a short distance until sensor X14 is again clear. The intermediate conveyor 13 thus advantageously is incrementally activated and only moves sufficiently far to deposit and store the next article M thereon in slightly spaced end-to-end relationship with the preceding article L.

It should be noted that during this off-on-off-on-off cycle of operation of conveyor 13, all other intermediate conveyors 12 through 7 remain off. None of these intermediate conveyors 12 through 7 is operated unless an article is sensed to be present at the downstream end of the preceding conveyor. If such previously stored article during the incremental movement of conveyor 13 is detected by sensor X13, intermediate conveyor 12 is turned on, until sensor X13 is clear, thereby moving the article from intermediate conveyor 13 to the intermediate conveyor 12. When sensor X13 is cleared, intermediate conveyor 12 is stopped, until the next article on conveyor 13 again activates sensor X13, which may occur if another randomly located existing article is on conveyor 13 or if in the interim, intermediate conveyor 13 has been completely filled.

Figure 3:
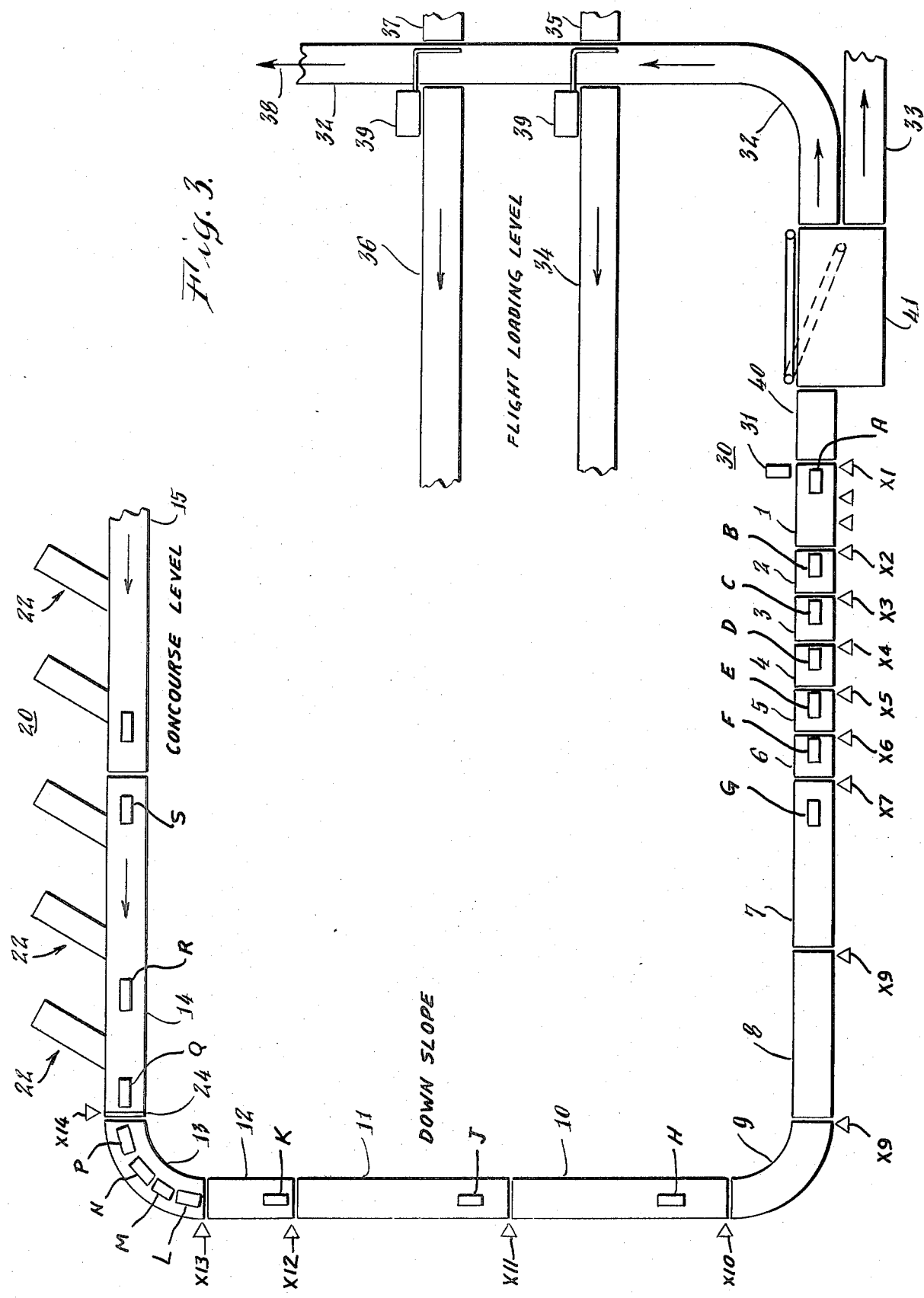
FIG. 3 is a plan view similar to FIG. 2 showing operation in the dynamic storage mode with articles becoming progressively stored on the upstream intermediate conveyors.

As is illustrated in FIG. 3, when intermediate conveyor 13 is completely filled, the downstream article L on intermediate conveyor 13 activates sensor X13, when the next on-coming article Q from input conveyor 14 activates sensor X14, which results in the turning on of conveyors 13 and 12, until both sensors X14 and X13 have been cleared. Accordingly, when the next occurring article R activates sensor X14 turning on intermediate conveyor 13, the article M which is now on the downstream end of intermediate conveyor 13 activates sensor X13 turning on intermediate conveyor 12, causing the upstream end of intermediate conveyor 12 to begin to fill up. On each activation of conveyor 12, randomly located article K is incrementally advanced until it is detected by sensor X12.

This sensing by sensor X12 of the article K on the downstream end of conveyor 12 in turn momentarily activates conveyor 11, thereby moving article K from conveyor 12 onto conveyor 11.

When both conveyors 12 and 13 have been completely filled, the dynamic storage mode of operation continues and now includes conveyor 11.

This inclusion of conveyors 13, 12 and 11 in the dynamic mode means that the next occurring article S arriving at the downstream end of input conveyor 14 will cause all three intermediate conveyors 13, 12 and 11 to be incrementally advanced, because there are articles now located at the downstream ends of the conveyors 13 and 12, causing actuation of sensors X13 and X12, respectively, while sensor X14 is also being actuated by newly-arrived article S.

In effect, the advantageous control action in the dynamic storage mode of operation is like a row of falling dominoes, because the incremental advance of each conveyor causes the article at the downstream end of that conveyor to actuate ("to trip") the sensor at its own downstream end, thereby causing the next successive conveyor to advance incrementally until the sensor no longer senses the presence of an article, i.e. until the sensor is no longer being actuated, that is, until the sensor is cleared.

This cumulative dynamic storage mode continues, and the empty conveyor space between randomly located articles J and H becomes progressively shorter, because the intermediate conveyor 10 on which article H is located remains stationary, while conveyors 13, 12 and 11 are being incrementally advanced as each newly input article arrives at the sensor X14. Finally, the upstream end of conveyor 10 begins to fill up, and so on, until articles are stored closely spaced end-to-end relationship on all of the intermediate conveyors 13 through 7, leaving no unused space.

Figure 4:
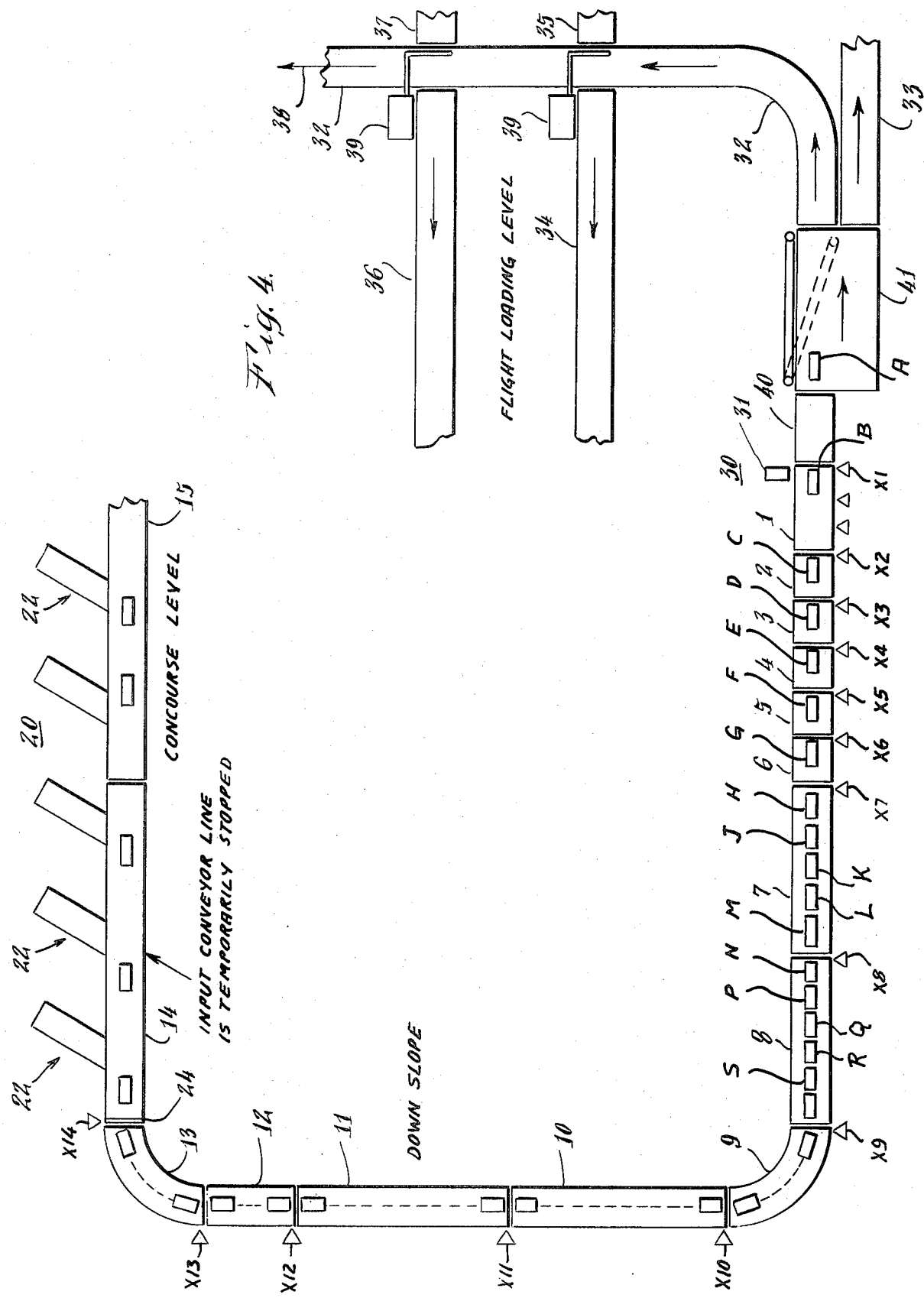
FIG. 4 is similar to FIG. 3 illustrating operation in the dynamic storage mode when an article is removed from the downstream buffer conveyor.

During the dynamic storage mode of operation which has been described, the article A on conveyor 1 can be coded and dispatched at any time. If prior to all of the intermediate conveyors becoming filled, the buffer conveyor 6 becomes unoccupied, as a result of a coding and removal of article A from conveyor 1, then articles B through G each advance for one space along the buffer conveyors 6 through 1, then all of the intermediate conveyors 13 through 7 are activated each moving sufficiently far until one article fills the empty space on the now empty buffer conveyor 6 as required, thus maintaining the end-to-end dynamic storage profile. This result is illustrated in FIG. 4.

After all of the available storage space is filled during the dynamic storage mode of operation, and if no articles happen to have been dispatched from the coding station 30, then this situation means that all of the storage conveyors have been completely filled. Then, the check-in process momentarily becomes inhibited, because the input conveyor line 16 through 14 automatically is stopped, thereby halting all check-in operations, until storage space is once again created by coding the articles out of the buffer conveyors 6 through 1. After clearing the "back log" of stored articles on the intermediate conveyors 7 through 13, the system once again reverts to running in the conventional continuous mode of operation.

The temporary dynamic storage provided by the present baggage handling system in which all of the intermediate conveyors 13 through 7 are utilized for temporary storage provides a relatively great capacity during "rush hour" and facilitates the ease of flow and accurate routing of the articles through the terminal. These advantageous operating characteristics gives the operator at the coding station 30 time properly to rout the articles in the order in which they are received. The dynamic storage feature prevents a jam-up or flooding overflow at the coding station, which in the past has caused delays and resulted in faulty baggage routing, during "rush hour", as discussed above.

For example, with a prior art conveyor system, if the coding operator is deluged with a large number of articles at one time, the operator may decide in desperation to remove the articles from the conveyor and stack them on the floor in a jumbled mass around the coding station until the operator can catch up. Such a jam-up unpredictably delays the routing of the randomly removed articles, which remain to be coded later on and generally provides for a disorganized and faulty coding function.

Figure 5:
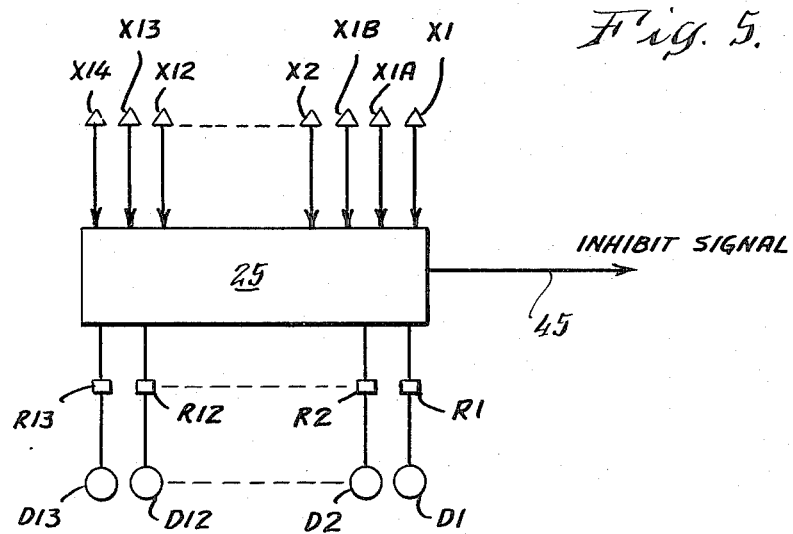
FIG. 5 is a block diagram illustrating one form of control system which may be utilized for the airline baggage handling method and system illustrated in FIGS. 1 through 4.

The control of this system is illustrated in one form thereof in FIG. 5 and is shown apart from FIGS. 1 through 4 for ease of understanding and illustration. The output from sensors X1 through X14 are applied to a commercially available process controller 25, for example such as is available from Eagle Signal Division of Gulf & Western Manufacturing Co., Industrial Controls, 736 Federal Street, Davenport, Iowa 52803, or from Square D. Company, Department S. A., Milwaukee, Wisconsin 53201, or from Texas Instruments, Inc., Industrial Controls Marketing, Mailing Station 1238, Attleboro, Massachusetts 02703. This controller includes latching circuits, a small microprocessor, counters, a master clock and relays $R_1$ through $R_{13}$ for controlling the respective conveyor drives $D_1$ through $D_{13}$.

There are two ways in which the respective conveyor drives $D_1$ through $D_{13}$ may be operated. One way is to allow the respective conveyor motors to run continuously and to include an electrically actuatable clutch in the mechanical power transmission which is connected between each drive motor and the conveyor pulley roll being driven. Thus, the conveyor is moved or stopped by engaging or disengaging the clutch. The other way to move or stop the conveyor is to start and stop the motor itself, with the motor being connected through a speed-reducing gear transmission with the conveyor pulley roller being driven. There is an electrically actuated brake for immediately positively stopping the respective conveyor whenever the motor is stopped.

It is my preference to use the latter method, namely, of starting and stopping the conveyor drive motor itself, when small and intermediate length conveyors are involved, because starting and stopping the motor is more efficient in use of electrical power and the mechanical transmission without a clutch is not so complex. However, where relatively long, heavy conveyor belts are involved, then it is more practical to engage and disengage a drive clutch while the motor runs continuously.

The controller 25 monitors the input signals from the various sensors X1 through X14 and is set up for producing the sequence of operating steps as discussed above. This controller actuates the relays $R_1$ through $R_{13}$ which in turn serve to control the respective conveyor drives $D_1$ through $D_{13}$.

The controller 25 also supplies an inhibit signal on a line 45 when all of the intermediate conveyors 13 through 7 are full for stopping the drives of conveyors 14 through 16 in the input conveyor line. As discussed above, when all of the available spaces in all of the conveyors 13 through 1 are full, then this inhibit signal is applied from the controller 25 to the line 45.

In order to assure an orderly flow of articles to the input conveyors 16 through 14 at the check-in station 20, which includes a plurality of sub-stations 22, each sub-station is provided, as is shown in FIG. 7, with series of three conveyors 51, 52, 53, each having a conveyor drive D51, D52 and D53, connected to another process controller 25-2, which is a commercially available controller similar to the one shown in FIG. 5. Each sub-station includes a "JOG" button 42, a DISPATCH button 44 and an emergency shutdown button 46. The agent stands at 47, and the customer at 48 places the article or articles onto the end conveyor 51.

Because my preference is to use photocells for the sensors and because the presence of an article actuates the sensor by blocking the light beam, the following description of the sub-stations 22 in connection with FIG. 7 will use the term "blocked" as being synonomous with "actuated" or "tripped" and will use the term "cleared" to mean that the sensor is no longer being blocked.

When the customer places an article on the conveyor 51, the sensor X51 becomes blocked, while the sensor X52 is clear because there is no article on the conveyor 52. The agent wishes to advance the article from the conveyor 51 to conveyor 52 where it is more convenient to be tagged by the agent with a tag indicating flight destination. Accordingly, the agent presses the "JOG" button 42. Because the sensor X51 is blocked while sensor X52 is clear, pressing the JOG button closes a latch control circuit in the processor 25-2 which actuates both relays R51 and R52, thereby causing both conveyors 51 and 52 to run until the article has advanced to a position to block the sensor X52, at which time the conveyors 51 and 52 stop running.

If the sensor X51 were clear, then pressing the JOG button would not cause any movement of conveyors 51 and 52. Similarly, if the sensor X52 were blocked by the presence of an article, then pressing the JOG button would not cause any movement of conveyors 51 and 52.

When the article has been advanced to block the sensor X52, the article can be tagged by the agent. The agent then presses the DISPATCH button 44 for dispatching the tagged article onto the input conveyor line 16 through 14. Pressing this DISPATCH button closes a latch control circuit in the processor 25-2. If the collision avoidance sensor X50 for the conveyor line 16 through 14 is clear, then closure of the latch control circuit causes both conveyors 52 and 53 to run for a predetermined dispatch count. This predetermined dispatch count is sufficiently long in time duration to assure that the dispatched tagged article will be injected fully by conveyors 52 and 53 onto the input conveyor line 16 through 14.

This dispatch count automatically stops at the instant when an inhibit signal is applied over the line 45 to the controller 25-2 or at the instant of an emergency shut-down. The dispatch count resumes at the moment when the inhibit or emergency is ended.

If the anti-collision sensor X50 is blocked by an article travelling along the conveyor line 16 through 14, then the pressing of the DISPATCH button sets the latch control circuit as before, but the dispatch count is inhibited. The dispatch count does not begin until after the sensor X50 has become clear and until an anti-collision count has been completed. This anti-collision count is sufficiently long in time duration to assure that an article which has cleared the sensor X50 will have passed completely by the juncture of the conveyor 53 with the conveyor line 16 through 14 before the dispatch count begins.

The anti-collision count automatically stops at the instant when an inhibit signal is applied over the line 45 or when an emergency shut-down occurs. The anti-collision count resumes when the inhibit or emergency is ended.

All of the various counters in the respective substations 22 are controlled by a master clock, and it is this master clock which is shut-off in the event of an inhibit or shut-down. In this way all of the respective counts immediately become "frozen" to await the ending of the inhibit or shut-down.

By virtue of using these counts which can become "frozen", the articles are moved in an orderly manner onto the input conveyor line 14 through 16. The articles are not bunched togehter in clumps. Moreover, by using these counts which are automatically "frozen" during inhibit or shut-down of the input line 14 through 16, the orderly procedure does not become confused by such temporary interruptions. All of the interrelationships between the respective positions of the articles are retained when the inhibit or shut-down is ended. Thus, the articles being dispatched from the respective sub-stations 22 are always delivered into an open space on the input conveyor 16 through 14.

There is the problem that the agents located at the upstream sub-stations 22 (those at the right in FIG. 1) might tend to "hog" the input conveyor line 16 through 14 during "rush hour" by flooding the input conveyor so that the downstream agents would have very little opportunity to inject their tagged articles into the input conveyor. To give every sub-station as nearly an equal opportunity as possible for injecting articles onto the input conveyor, there are brief staggered time periods when the dispatch counters for the conveyors 52, 53 at the respective substations are enabled to begin counting so as to inject articles. In other words, the agent presses the DISPATCH button, the latching circuit becomes latched, the procedures are carried out as discussed above for avoiding collision, but nevertheless the dispatch count does not begin unless it is enabled to do so during a cyclically reoccurring time slot, as will be discussed.

Thus, the dispatch counters for the group of substations 22 along the upstream input conveyor 16 are enabled to begin counting for a period (a time slot) of four seconds. Then, the dispatch counters for the group of sub-stations 22 along the next input conveyor 15 are enabled to begin counting for a period or time slot of six seconds. Finally, the dispatch counters for the group of sub-stations along the last input conveyor are enabled to begin counting for a period or time slot of eight seconds, and then the cycle repeats. If there were a fourth group of sub-stations, their dispatch counters would be enabled to begin counting for a time slot of ten seconds.

From the above description of the action of each sub-station in injecting articles onto the input conveyor line 16 through 14 it will be understood that in theory the articles should always arrive at the sensor X14 one-at-a-time. Therefore, the articles should always arrive on the buffer conveyor 1 at the coding station one-at-a-time. In theory two articles should not arrive at the sensor X14 in overlapped relationship, because the articles will then remain overlapped on each conveyor in succession until they reach the coding station where they will cause difficulties in operation, as will be explained. However, customers sometimes do place two articles at once on a check-in conveyor 51. The agent 47 may be very busy and will take the easy course of allowing the two articles to remain overlapped on the tagging conveyor 52. The agent will tag each article and then will press the DISPATCH button sending them simultaneously on their way in overlapped relationship. The result is that overlapped articles do arrive at the coding station from time-to-time. It is also possible that an article which is easily moved with respect to the conveyor, for example such as a baby carriage or a luggage item on a wheeled dolly, may shift its position so as to become overlapped with a preceeding or following article. In such a case of jam-up can begin to occur at the coding station, for the coding and dispatch of one of the two overlapped articles may cause the conveyor system to deliver a third article to the coding station before the second overlapped article has been coded and dispatched, and so forth. Soon another pair of overlapped articles may arrive and compound the jam-up problem at the coding station. Also, two overlapped articles may be tagged for different distinations, such that the coding operator must deal with them individually.

Figure 6:
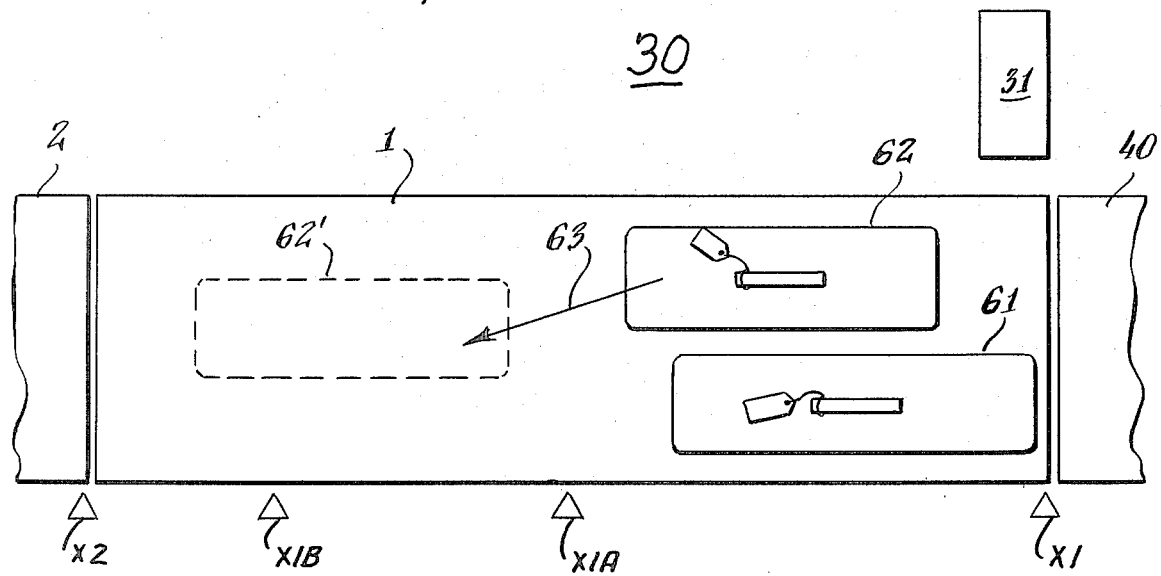
FIG. 6 is an enlarged plan view of the downstream buffer conveyor near the coding station for illustrating the separation handling of overlapping articles.

Therefore, in order to enable the coding operator to "split" overlapped articles whenever they may occur, the buffer conveyor 1 is arranged with sensors as shown enlarged in FIG. 6. This conveyor 1 is sufficiently long to contain the longest article likely to occur, for example it is six to nine feet long. The sensor X1 is located within a few inches of the downstream end of conveyor 1. The sensor X1A is located near the approximate longitudinal center of conveyor 1; while the sensor X1B is approximately one-quarter of the conveyor length from the upstream end, namely, about 1.5 feet to 2.5 feet from the upstream end. The sensors X1B and X1A serve to establish and to maintain an open space on the upstream end of the conveyor 1. Any time that the sensor X1B and X1A is blocked, the second buffer conveyor 2 does not run. Consequently, there is always a space available on the upstream end of conveyor 1 to enable the operator to "split" overlapped articles.

As shown in FIG. 6 there are two overlapped articles 61 and 62, for example two luggage bags, which have arrived at the coding station. The leading end of the article 61 has actuated the sensor X1, and so conveyor 1 has stopped. The coding operator notes the overlapped articles and as shown by arrow 63, manually slides the article 62 backward to a separated position shown dotted at 62'. The coding operator notes the destination of the article 61 and presses the appropriate destination button on the coding panel 31. The conveyor 1 then runs for a predetermined time to transfer the article 61 onto the take-away conveyor 40.

There is a predetermined take-away count which lasts for approximately 250 milliseconds to provide sufficient time for the longest typical article to be transferred from conveyor 1 onto the take-away conveyor 40. The article 61 is transferred onto the take-away conveyor during this take-away count.

If the second article now at 62' does not quite reach the sensor X1 during the take-away count, then the conveyor 1 continues to run until the sensor X1 is actuated, thereby stopping conveyor 1.

The purpose of the additional sensors X1B and X1A is to inhibit conveyor 2, as described above. If either or both of sensors X1B and X1A is blocked at the time when the coding button in panel 31 is pressed, then conveyor 2 is automatically inhibited and does not run. Therefore, the second article 62' can travel forward until the sensor X1 is actuated, without any third article prematurely arriving on conveyor 1. The coding operator reads the destination on the tag of the second article and presses the appropriate button on panel 31 to send it on its way, thereby starting another take-away count. As soon as the second article has cleared the sensor X1, and since the sensors X1A and X1B are now both clear, the second buffer conveyor 2 now commences running to deliver the next article onto the first buffer conveyor 1. If this next article does not quite reach the sensor X1 during the take-away count, then once again conveyor 1 continues to run until the sensor X1 is actuated.

The method and system thus described allow starting and stopping of the entire system without the loss of positioning nor loss of timing of the location of the various articles in the system. The system promotes an even and orderly flow of articles from a concourse checking station which may include a multiple number of sub-stations to a coding station positioned remotely therefrom. The ability to store articles along the entire path between the check-in station and the coding station enables the convenient handling of a large volume of articles during rush hour and facilitates an unjumbled and accurate routing operation by the coding operator. Since this dynamic storage advantageously avoids pile-up at the coding station, the coding operator may route the respective articles quickly and accurately without being harried, which would not be possible if a huge pile-up of uncoded articles accumulated at the coding station as has been characteristic of prior airline baggage handling systems.

Moreover, there is always a space provided and maintained on the upstream end of the conveyor located adjacent to the coding station. The coding operator is thereby enabled to reach over and slide backward any overlapping bag and can proceed with the coding operation without any jam-up occurring, even if a sequence of several groups of overlapped articles might happen to occur.

Since other modifications and changes varied to fit particular operating requirements and environments will be apparent to those skilled in the art, the invention is not considered limited to the example chosen for purposes of illustration and includes all changes and modifications which do not constitute departures from the true spirit and scope of this invention as claimed in the following claims.

What is claimed is:

1. A method for automatically handling individually identified articles such as parcels, baggage, items of cargo and the like on a conveyor system comprising a series of individually operable conveyors arranged in a continuous path for the transport of the articles between a check-in station having input conveyor means and a coding station including a plurality of short buffer conveyors with a plurality of intermediate conveyors arranged end-to-end between said input conveyor means and said buffer conveyors comprising the steps of:
   (a) simultaneously activating all of said intermediate conveyors and all of said buffer conveyors for operating said conveyor system in a conventional transport mode;
   (b) placing checked-in articles on said input conveyor means to be transported via said intermediate conveyors to said buffer conveyors at said coding station;
   (c) sensing for the presence of an article near the downstream end of each of said short buffer conveyors at said coding station;
   (d) sensing for the presence of an article near the downstream end of each intermediate conveyor;
   (e) selectively stopping the downstream buffer conveyor and each preceeding buffer conveyor at said coding station when a stored article is sensed as being present near the downstream end of the respective conveyor;
   (f) deactivating said intermediate conveyors when all of said buffer conveyors have articles sensed as being present thereon and have been stopped, thereby placing the system in a dynamic storage mode of operation, while allowing said input conveyor means to continue running;
   (g) sensing the presence of each checked-in article near the downstream end of said input conveyor means;
   (h) selectively briefly activating the first intermediate conveyor until each such checked-in article has been removed from the end of said input conveyor means and has been transferred onto the upstream end of the first intermediate conveyor;
   (i) selectively briefly activating each succeeding intermediate conveyor whenever an article is sensed as being present near the downstream end of the preceeding intermediate conveyor.
   thereby progressively filling all of the space on all the intermediate conveyors with articles slightly spaced one from another as checked-in articles are fed from the input conveyor means;
   (j) returning to the conventional transport mode of operation when the upstream buffer conveyor is cleared of the article temporarily stored thereon; and
   (k) deactivating the input conveyor means whenever it happens that all of the space on all of the intermediate conveyors has become full of temporarily stored articles.

2. A method for automatically handling individually identified articles as claimed in claim 1, including steps for permitting a coding operator to split overlapped articles at the coding station comprising:
   providing said downstream buffer conveyor at the coding station sufficiently long for positioning two articles thereon spaced end-to-end;
   sensing for the presence of an article on said buffer conveyor at an intermediate location thereon;

selectively deactivating the preceeding buffer conveyor whenever an article is sensed as being present on the downstream buffer conveyor either near its downstream end or at said intermediate location;

allowing the downstream buffer conveyor to continue running until an article is sensed as being present at its downstream end;

thereby always providing an open space on the upstream end of said downstream buffer conveyor at the time when an article is sensed as being present at the downstream end of said downstream buffer conveyor, whereby if the sensed article at said downstream end is actually two articles in overlapped relationship, the coding operator can manually slide one of the overlapped articles backward into the nearby available open space on the upstream end of said downstream buffer conveyor.

3. A method for automatically handling individually identified articles as claimed in claim 1, including the steps of:

providing a plurality of sub-station conveyors for feeding in parallel relationship into said input conveyor means at spaced intersections along said input conveyor means;

sensing for the presence of an article on said input conveyor means at a predetermined point upstream from each intersection with a sub-station conveyor; and inhibiting the dispatch of a newly tagged article from a sub-station conveyor onto said input conveyor means whenever an article is sensed as being upstream therefrom at the predetermined point.

4. A method for automatically handling individually identified articles as claimed in claim 3, including the step of:

starting a collision avoidance count at the instant when an article is sensed at the predetermined upstream point, said collision avoidance count having a sufficiently long time duration for permitting the sensed article to pass by the intersection before the newly tagged article is dispatched from the sub-station conveyor onto the input conveyor means;

temporarily stopping said collision avoidance count whenever the input conveyor means is temporarily stopped; and resuming said collision avoidance count when the input conveyor means again starts running, thereby preserving the relationship between the travel of articles on the input conveyor means and the dispatch of newly tagged articles from the sub-station conveyor.

5. A method for automatically handling individually identified articles as claimed in claim 3 or 4 including the step of:

enabling a first group of sub-station conveyors which are located nearer the upstream end of the input conveyor means to dispatch newly tagged articles onto the input conveyor means during cyclically repeated brief time periods;

inhibiting said first group of conveyors from dispatching newly tagged articles onto the input conveyor means during cyclically repeated longer time periods alternating in sequence with said brief time periods; and enabling a second group of sub-station conveyors which are located further from the upstream end of the input conveyor means to dispatch newly tagged articles onto the input conveyor means during said longer time periods, thereby preventing the first group of sub-station conveyors from "hogging" use of the input conveyor means.

6. An airline baggage handling system for transporting articles from a check-in station to a coding station where the articles are routed to specific destinations comprising:

(a) a series of individually operable intermediate conveyors arranged in a continuous path between said check-in station having input conveyor means and said coding station having a plurality of short buffer conveyors;

(b) sensing means for detecting the presence of an article at the downstream end of said input conveyor means;

(c) sensing means for detecting the presence of articles at the downstream end of each of said intermediate and buffer conveyors;

(d) means for simultaneously activating each of said intermediate and buffer conveyors for transporting articles from said input conveyor means at said check-in station to said coding station;

(e) means for selectively stopping each of said buffer conveyors in progressive order from the downstream buffer conveyor to the upstream buffer conveyor as an article is detected as being present at the downstream end of the respective buffer conveyor;

(f) means for stopping said intermediate conveyors while allowing said input conveyor means to continue running for changing the system over into a dynamic storage mode of operation so long as the upstream buffer conveyor has an article stored thereon as a result of the fact that all of said buffer conveyors have articles stored thereon;

(g) means for selectively briefly operating the first intermediate conveyor when an article is detected as being present at the downstream end of said input conveyor means for transferring the article from said input conveyor means to the upstream end of said first intermediate conveyor;

(h) means for selectively briefly operating in sequence each succeeding intermediate conveyor whenever an article is detected as being present at the downstream end of the preceeding intermediate conveyor for transferring the detected article from the preceeding intermediate conveyor to the upstream end of the succeeding intermediate conveyor, thereby progressively filling the entire lengths of all immediate conveyors to dynamically store articles throughout the system; and means for activating all of said intermediate conveyors for changing the system over into the normal conveyor mode of operation when an article is no longer detected as being present on the upstream buffer conveyor.

7. An airline baggage handling system as claimed in claim 6, including:

means for stopping the input conveyor means when the entire lengths of all intermediate conveyors have become filled with dynamically stored articles thereon.

8. An airline baggage handling system as claimed in claim 6 or 7 in which:
   said downstream buffer conveyor at the coding station is sufficiently long for positioning two articles thereon spaced end-to-end;
   sensing means for detecting the presence of an article on said downstream buffer conveyor at an intermediate location thereon;
   means for selectively deactivating the preceeding buffer conveyor whenever an article is detected as being present on the downstream buffer conveyor either near its downstream end or at said intermediate location;
   means for allowing the downstream buffer conveyor to continue running until an article is sensed as being present at its downstream end;
   thereby always providing an open space on the upstream end of said downstream buffer conveyor at the time when an article is sensed as being present at the downstream end of said downstream buffer conveyor,
   whereby if the sensed article at said downstream end is actually two articles in overlapped relationship, the coding operator can manually slide one of the overlapped articles backward into the nearby available open space on the upstream end of said downstream buffer conveyor.

9. An airline baggage handling system as claimed in claim 6 or 7 in which:
   a plurality of sub-station conveyors are located in spaced parallel relationship at said check-in station for feeding in parallel relationship into said input conveyor means at spaced intersections along said input conveyor means;
   sensing means for detecting the presence of an article on said input conveyor means at a predetermined point upstream from each intersection with a sub-station conveyor; and
   inhibiting means for inhibiting the dispatch of a newly tagged article from a sub-station conveyor onto said input conveyor means whenever an article is sensed as being upstream therefrom at such a predetermined point.

10. An airline baggage handling system as claimed in claim 9 in which:
    means are provided for enabling a first group of sub-station conveyors which are located nearer the upstream end of the input conveyor means to dispatch newly tagged articles onto the input conveyor means during cyclically repeated brief time periods;
    means are provided for inhibiting said first group of conveyors from dispatching newly tagged articles onto the input conveyor means during cyclically repeated longer time periods alternating in sequence with said brief time periods; and
    means are provided for enabling a second group of sub-station conveyors which are located further from the upstream end of the input conveyor means to dispatch newly tagged articles onto the input conveyor means during said longer time periods,
    thereby preventing the first group of sub-station conveyors from "hogging" use of the input conveyor means.

11. An airline baggage handling system as claimed in claim 9 in which:
    collision avoidance count means are provided at the check-in station, said count means being started at the instant when an article is sensed at the predetermined upstream point, said collision avoidance count having a sufficiently long time duration for permitting the sensed article to pass by the intersection before the newly tagged article is dispatched from the sub-station conveyor onto the input conveyor means;
    means are provided for temporarily stopping said collision avoidance count whenever the input conveyor means is temporarily stopped and for resuming said collision avoidance count when the input conveyor means again starts running,
    thereby preserving the relationship between the travel of articles on the input conveyor means and the dispatch of newly tagged articles from the sub-station conveyor in spite of temporary stopping of said input conveyor means.

12. The airline baggage handling system as claimed in claim 6 or 7 in which:
    a plurality of sub-station conveyors are positioned at said check-in station; said sub-station conveyors each merging with said input conveyor means at an individual intersection therewith; and
    means for selectively activating and controlling said sub-station conveyors so that an article on the input conveyor passes the intersection with a sub-station conveyor before a newly tagged article can be dispatched from the sub-station conveyor onto the input conveyor means,
    thereby avoiding collisions between the newly tagged articles being dispatched from the respective sub-station conveyors and articles which are already being conveyed by said input conveyor means.

13. Dynamic storage method for automatically storing individual articles on a conveyor system comprising a series of individually operable conveyors arranged in a continuous path for the transport of the articles between input conveyor means and a downstream station including a plurality of short buffer conveyors with a plurality of intermediate conveyors arranged end-to-end between said input conveyor means and said buffer conveyors comprising the steps of:
   (a) simultaneously activating all of said intermediate conveyors and all of said buffer conveyors for operating said conveyor system in a conventional transport mode;
   (b) placing incoming articles on said input conveyor means to be transported via said intermediate conveyors to said buffer conveyors near said downstream station;
   (c) sensing for the presence of an article near the downstream end of each of said short buffer conveyors;
   (d) sensing for the presence of an article near the downstream end of each intermediate conveyor;
   (e) selectively stopping the downstream buffer conveyor and each preceding buffer conveyor when a stored article is sensed as being present near the downstream end of the respective buffer conveyor;
   (f) deactivating said intermediate conveyors when all of said buffer conveyors have articles sensed as being present thereon and have been stopped, thereby placing the system in a dynamic storage mode of operation, while allowing said input conveyor means to continue running;

(g) sensing the presence of each incoming article near the downstream end of said input conveyor means;

(h) selectively briefly activating the first intermediate conveyor until each such sensed incoming article has been removed from the downstream end of said input conveyor means and has been transferred onto the upstream end of the first intermediate conveyor;

(i) selectively briefly activating each succeeding intermediate conveyor whenever an article is sensed as being present near the downstream end of the preceding intermediate conveyor, thereby progressively filling available space on the respective intermediate conveyors with articles slightly spaced one from another as incoming articles are fed from the input conveyor means;

(j) returning to the conventional transport mode of operation when the upstream buffer conveyor is cleared of the article temporarily stored thereon; and (k) deactivating the input conveyor means whenever it happens that the available space on all of the intermediate conveyors has become full of temporarily stored articles.

14. The dynamic storage method for automatically storing individual articles as claimed in claim 13, including steps for permitting an operator to split overlapped articles at the downstream station comprising:

providing said downstream buffer conveyor at the downstream station sufficiently long for positioning two articles thereon spaced end-to-end;

sensing for the presence of an article on said downstream buffer conveyor at an intermediate location thereon;

selectively deactivating the preceding buffer conveyor whenever an article is sensed as being present on the downstream buffer conveyor either near its downstream end or at said intermediate location;

allowing the downstream buffer conveyor to continue running until an article is sensed as being present at its downstream end;

thereby always providing an open space on the upstream end of said downstream buffer conveyor at the time when an article is sensed as being present at the downstream end of said downstream buffer conveyor, whereby if the sensed article at said downstream end is actually two articles in overlapped relationship, the operator can manually slide one of the overlapped articles backward into the nearby available open space on the upstream end of said downstream buffer conveyor.

15. The dynamic storage for automatically storing individual articles as claimed in claim 13, including the steps of:

providing a plurality of injection conveyors for feeding in parallel relationship onto said input conveyor means at spaced intersections along said input conveyor means;

sensing for the presence of an article on said input conveyor means at a predetermined point upstream from each intersection with an injection conveyor; and inhibiting the dispatch of an incoming article from a respective injection conveyor onto said input conveyor means whenever an article is sensed as being upstream therefrom at the predetermined point.

16. The dynamic storage method for automatically storing individual articles as claimed in claim 15, including the step of:

starting a collision avoidance count at the instant when an article is sensed at the predetermined upstream point, said collision avoidance count having a sufficiently long time duration for permitting the sensed article to pass by the intersection before the incoming article is dispatched from the injection conveyor onto the input conveyor means;

temporarily stopping said collision avoidance count whenever the input conveyor means is temporarily stopped; and resuming said collision avoidance count when the input conveyor means again starts running, thereby preserving the relationship between the travel of articles on the input conveyor means and the dispatch of newly tagged articles from the sub-station conveyor.

17. The dynamic storage method for automatically storing individual articles as claimed in claim 15 or 16 including the step of:

enabling a first group of injection conveyors which are located nearer the upstream end of the input conveyor means to dispatch incoming articles onto the input conveyor means during cyclically repeated brief time periods;

inhibiting said first group of injection conveyors from dispatching incoming articles onto the input conveyor means during cyclically repeated longer time periods alternating in sequence with said brief time periods; and enabling a second group of injection conveyors which are located further from the upstream end of the input conveyor means to dispatch incoming articles onto the input conveyor means during said longer time periods, thereby preventing the first group of injection conveyors from "hogging" use of the input conveyor means.

18. A dynamic storage system for conveying articles from an input location to a downstream station and for temporarily storing the articles comprising:

(a) input conveyor means at said input location;

(b) a plurality of short buffer conveyors arranged in sequence near said downstream station;

(c) a series of individually operable intermediate conveyors arranged in a continuous path between said input conveyor means and said plurality of short buffer conveyors;

(d) sensing means for detecting the presence of an article at the downstream end of said input conveyor means;

(e) sensing means for detecting the presence of articles at the downstream end of each of said intermediate and buffer conveyors;

(f) means for simultaneously activating each of said intermediate and buffer conveyors for transporting articles from said input conveyor means to the first of said buffer conveyors;

(g) means for selectively stopping each of said buffer conveyors in progressive order from the downstream buffer conveyor to the first buffer conveyor whenever an article is detected as being present at the downstream end of the respective buffer conveyor;

(h) means for stopping said intermediate conveyors while allowing said input conveyor means to continue running for changing the system over into a dynamic storage mode of operation so long as the first buffer conveyor has an article stored thereon as a result of the fact that all of said buffer conveyors temporarily have articles stored thereon;

(i) means for selectively briefly operating the first intermediate conveyor when an article is detected as being present at the downstream end of said input conveyor means for transferring the article from said input conveyor means to the upstream end of said first intermediate conveyor;

(j) means for selectively briefly operating in sequence each succeeding intermediate conveyor whenever an article is detected as being present at the downstream end of the preceding intermediate conveyor for transferring the detected article from the preceding intermediate conveyor to the upstream end of the succeeding intermediate conveyor, thereby progressively filling the lengths of the respective immediate conveyors to dynamically store articles throughout the system; and means for activating all of said intermediate conveyors for changing the system over into the normal conveyor mode of operation when an article is no longer detected as being present on the first buffer conveyor.

19. The dynamic storage system for temporarily storing articles as claimed in claim 18, including:

(k) means for stopping the input conveyor means when the lengths of the respective intermediate conveyors have become filled with articles temporarily stored thereon.

20. The dynamic storage system for temporarily storing articles as claimed in claim 18 or 19, in which:

a plurality of infeed conveyors are located in spaced parallel relationship at said input location for feeding in parallel relationship onto said input conveyor means at spaced intersections along said input conveyor means;

sensing means are provided for detecting the presence of an article on said input conveyor means at a predetermined point upstream from each intersection with a respective infeed conveyor; and inhibiting means are provided for inhibiting the infeeding of an article from an infeed conveyor onto said input conveyor means at such an intersection whenever an article is sensed as being upstream from said intersection at the respective predetermined point.

21. The dynamic storage system for temporarily storing articles as claimed in claim 20, in which:

means are provided for enabling a first group of infeed conveyors which are located nearer the upstream end of the input conveyor means to feed articles onto the input conveyor means during cyclically repeated brief time periods;

means are provided for inhibiting said first group of conveyors from feeding articles onto the input conveyor means during cyclically repeated longer time periods alternating in sequence with said brief time periods; and means are provided for enabling a second group of infeed conveyors which are located further from the upstream end of the input conveyor means to feed articles onto the input conveyor means during said longer time periods, thereby preventing the first group of infeed conveyors from "hogging" use of the input conveyor means.

22. The dynamic storage system for temporarily storing articles as claimed in claim 18 or 19, in which:

a plurality of infeed conveyors are positioned at said input location, said infeed conveyors each merging with said input conveyor means at an individual intersection therewith; and means for selectively activating and controlling said infeed conveyors so that an article on the input conveyor passes the intersection with an infeed conveyor before an article can be fed from the infeed conveyor onto the input conveyor means, thereby avoiding collisions between the articles being fed from the respective infeed conveyors and articles which are already being conveyed by said input conveyor means.

* * * * *